(12) United States Patent
Hammad et al.

(10) Patent No.: US 8,770,470 B2
(45) Date of Patent: *Jul. 8, 2014

(54) DEVICE INCLUDING FORM FACTOR INDICATOR

(75) Inventors: Ayman Hammad, Pleasanton, CA (US); Brian Maw, Belmont, CA (US)

(73) Assignee: Visa U.S.A. Inc., San Francisco, CA (US)

(*) Notice: Subject to any disclaimer, the term of this patent is extended or adjusted under 35 U.S.C. 154(b) by 1120 days.

This patent is subject to a terminal disclaimer.

(21) Appl. No.: 12/431,430

(22) Filed: Apr. 28, 2009

(65) Prior Publication Data

US 2009/0266881 A1 Oct. 29, 2009

Related U.S. Application Data

(60) Provisional application No. 61/048,814, filed on Apr. 29, 2008.

(51) Int. Cl.
*G06F 17/00* (2006.01)

(52) U.S. Cl.
USPC .......................... 235/375; 235/380; 235/492

(58) Field of Classification Search
USPC ................ 235/375, 380, 492; 705/17, 41
See application file for complete search history.

(56) References Cited

U.S. PATENT DOCUMENTS

| | | | |
|---|---|---|---|
| 4,114,027 A | 9/1978 | Slater et al. | |
| 6,325,285 B1 | 12/2001 | Baratelli | |
| 6,883,718 B1 * | 4/2005 | Le et al. | 235/492 |
| 7,318,049 B2 | 1/2008 | Iannacci | |
| 7,356,541 B1 | 4/2008 | Doughty | |
| 7,542,942 B2 | 6/2009 | Peart et al. | |
| 7,668,754 B1 * | 2/2010 | Bridgelall | 705/26.9 |
| 7,761,374 B2 | 7/2010 | Sabota et al. | |
| 7,865,141 B2 * | 1/2011 | Liao et al. | 455/41.2 |
| 7,954,717 B2 * | 6/2011 | Narendra et al. | 235/451 |
| 7,962,390 B2 | 6/2011 | Maw et al. | |
| 8,010,428 B2 * | 8/2011 | Maw et al. | 705/35 |
| 2003/0121969 A1 | 7/2003 | Wankmueller | |
| 2003/0167207 A1 | 9/2003 | Berardi et al. | |
| 2004/0128243 A1 | 7/2004 | Kavanagh et al. | |
| 2005/0018670 A1 | 1/2005 | Shigematsu et al. | |
| 2005/0080726 A1 | 4/2005 | Krajewski et al. | |
| 2006/0004746 A1 | 1/2006 | Angus et al. | |
| 2006/0022033 A1 | 2/2006 | Smets et al. | |
| 2007/0055630 A1 | 3/2007 | Gauthier et al. | |

(Continued)

FOREIGN PATENT DOCUMENTS

| | | |
|---|---|---|
| KR | 10-0795142 B1 | 1/2008 |
| WO | WO 2006/077281 A1 | 7/2006 |

OTHER PUBLICATIONS

International Search Report and Written Opinion from PCT/US2009/041961, dated Nov. 30, 2009 (11 pages).

(Continued)

*Primary Examiner* — Ashik Kim
(74) *Attorney, Agent, or Firm* — Kilpatrick Townsend & Stockton LLP (57) ABSTRACT

A consumer device is disclosed. The device comprises a body, and a memory comprising a computer readable medium disposed on or within the body. The computer readable medium comprises a form factor indicator element coupled to the body. The form factor indicator element indicates the form factor for the consumer device.

20 Claims, 6 Drawing Sheets

(56) References Cited

U.S. PATENT DOCUMENTS

| | | |
|---|---|---|
| 2007/0094154 A1 | 4/2007 | Rau et al. |
| 2007/0131761 A1 | 6/2007 | Smets et al. |
| 2007/0136211 A1 | 6/2007 | Brown et al. |
| 2007/0205275 A1 | 9/2007 | Nicola et al. |
| 2007/0255662 A1 | 11/2007 | Tumminaro |
| 2008/0027815 A1 | 1/2008 | Johnson et al. |
| 2008/0040285 A1 | 2/2008 | Wankmueller |
| 2008/0058014 A1 | 3/2008 | Khan et al. |
| 2008/0103968 A1 | 5/2008 | Bies et al. |
| 2008/0175390 A1 | 7/2008 | Alessio et al. |
| 2009/0083159 A1* | 3/2009 | Maw ................... 705/17 |
| 2009/0140839 A1 | 6/2009 | Bishop et al. |
| 2009/0265273 A1 | 10/2009 | Guntupalli et al. |
| 2010/0228668 A1* | 9/2010 | Hogan et al. ......... 705/41 |
| 2011/0202465 A1* | 8/2011 | Mashhour ............ 705/67 |

OTHER PUBLICATIONS

International Search Report from PCT/US2008/076770, dated Nov. 18, 2008 (3 pages).

International Search Report from PCT/US2009/046402, dated Jul. 23, 2009 (2 pages).

Office Action dated Mar. 16, 2011 from U.S. Appl. No. 12/431,452, 7 pages.

Kennedy, Kristen; "The Incredible Shrinking Form Factor"; 2002, CRN, vol. 996, pp. 46-50.

"EMV '96 Integrated Circuit Card Specification for Payment Systems," Jun. 30, 1996, pp. 1-187. © 1996 Europay International S.A., MasterCard International Incorporated, and Visa International Service Association.

Australian Office Action mailed on Sep. 4, 2012 for AU Patent Application No. 2008304655, 4 pages.

European Search Report mailed on Sep. 22, 2011 for EP Patent Application No. 08834271.2, 6 pages.

European Office Action mailed on Aug. 3, 2012 for EP Patent Application No. 08834271.2, 7 pages.

Final Office Action mailed on Aug. 4, 2011 for U.S. Appl. No. 12/431,452, 8 pages.

Final Office Action mailed on Jun. 11, 2010 for U.S. Appl. No. 12/156,923, 10 pages.

Non-Final Office Action mailed on Dec. 12, 2012 for U.S. Appl. No. 12/431,430, 8 pages.

Non-Final Office Action mailed on Jan. 10, 2013 for U.S. Appl. No. 12/431,452, 10 pages.

Non-Final Office Action mailed on Sep. 14, 2009 for U.S. Appl. No. 12/156,923, 9 pages.

Notice of Allowance mailed on Dec. 15, 2010 for U.S. Appl. No. 12/156,923, 13 pages.

Notice of Allowance mailed on Mar. 18, 2011 for U.S. Appl. No. 11/904,471, 7 pages.

Notice of Allowance mailed on Dec. 1, 2011 for U.S. Appl. No. 13/050,192, 10 pages.

Office Action mailed Nov. 28, 2011 in U.S. Appl. No. 13/163,352, 14 pages.

Notice of Allowance mailed Mar. 20, 2012 in U.S. Appl. No. 13/163,352, 11 pages.

Final Office Action mailed on Jul. 2, 2013 for U.S. Appl. No. 12/431,452, 11 pages.

Australian Notice of Acceptance mailed on Aug. 14, 2013 for AU Patent Application No. 2008304655, 2 pages.

European Decision of Rejection mailed on May 6, 2013 for EP Patent Application No. 08834271.2, 4 pages.

* cited by examiner

DEVICE INCLUDING FORM FACTOR INDICATOR

CROSS-REFERENCES TO RELATED APPLICATIONS

This application claims priority to and is a non-provisional of U.S. provisional patent application No. 61/048,814, filed on Apr. 29, 2008, which is incorporated herein by reference in its entirety for all purposes.

BACKGROUND

A traditional payment process utilizing a bank issued payment card includes the reading of data from a contactless payment card in the form of track data. An authorization request message including the data from the contactless payment card is thereafter generated by an access device. This authorization request message is then sent to the issuer of the contactless payment card. Other transaction information including an indicator of the type of transaction (e.g., contactless) and the amount of the transaction is also included in the authorization request message. After the issuer receives the authorization request message, the issuer sends an authorization response message back to the merchant with an immediate authorization or decline of the transaction at the time of the purchase based on the issuer's rules for authorization. This is considered an on-line transaction.

While traditional payment processes such as these are useful, improved services and improved functionality in the context of payment transactions would also be desirable.

Embodiments of the invention address these and other problems, individually and collectively.

BRIEF SUMMARY

Embodiments of the invention are directed to consumer devices, methods, and systems that use form factor indicators in transactions such as purchase transactions.

One embodiment of the invention is directed to a consumer device comprising a body and a memory. The memory comprises a computer readable medium disposed on or within the body. The computer readable medium comprises code for a form factor indicator. The form factor indicator indicates the form factor for the consumer device.

Another embodiment of the invention is directed to a method comprising: receiving, at a server computer, an authorization request message comprising a form factor indicator, wherein the form factor indicator was previously stored in a consumer device; analyzing the authorization request message; and performing additional processing based on the form factor indicator; and performing additional processing based on the form factor indicator.

Another embodiment of the invention is directed to a computer usable medium comprising computer readable program code embodied therein. The computer readable program code is adapted to be executed by a processor to implement a method for processing a form factor indicator. The method comprises receiving an authorization request message comprising a form factor indicator, wherein the form factor indicator was previously stored in a consumer device. The method also comprises analyzing the authorization request message and performing additional processing based on the form factor indicator.

Another embodiment of the invention is directed to a method comprising: obtaining a portable consumer device comprising a body, and a memory comprising a computer readable medium disposed on or within the body, the computer readable medium comprising code for a form factor indicator, wherein the form factor indicator indicates the form factor for the consumer device; and using the portable consumer device to interact with an access device, wherein the access device thereafter generates and sends an authorization request message to an issuer associated with the portable consumer device.

Embodiments of the invention are directed to specific combinations of these different aspects, as well as specific embodiments related to those specific aspects.

DETAILED DESCRIPTION

Embodiments of the invention involve the use of a supplementary data field as a vehicle for providing additional data in the authorization request messages from a point of sale to an issuer. The supplementary data field may be Field 55 as defined in Visa Contactless Payment Specification 2.x. The supplementary data in the supplementary data field can be used for a variety of new services that can enhance traditional transactions.

Embodiments of the invention can include the use of data tags assigned or enhanced in the supplementary data field of an authentication request message, for the purpose of moving additional data in the authorization request message. Exemplary data tags may include a form factor indicator tag and a customer exclusive data tag. The data within these tags may be utilized alone or together, and may be in the clear or encrypted.

A "data tag" may include one or more data elements in any suitable form. In some embodiments, a data tag may include a tag identifier element, a length element, and a value element. The tag identifier element may be embodied by one or more characters, which indicate a characteristic of the data tag. For example, a customer exclusive data tag identifier element may indicate that its corresponding data tag is related to data that is specifically associated with the consumer. A length element may indicate the length of the value element in the data tag, or could indicate the length of the data tag itself. For example, a length element, which has the value "4," may indicate that the value element may have four characters. The length element advantageously indicates the size of its corresponding value element so that a computer apparatus that reads the data tag will know how large the data tag or value element of the data tag will be. Lastly, a value element can be a substantive value associated with the data tag.

Illustratively, a consumer's phone number could be a substantive value and can be a value element. As an illustration, a data tag including a customer's phone number might be 99105555555555. "99" might be a tag identifier element indicating a phone number. "10" might be an indication of the length of the value. "5555555555" might be a value corresponding to a phone number.

Two specific types of data tags, a form factor indicator tag and a customer exclusive data tag, are described below, and these two specific types of data tags may be used together, or independently of each other.

Payment transactions and other transactions can be initiated by portable consumer devices with various form factors. Such form factors include mini-cards, micro tags, key FOBs, cell phones, netbooks, watches, and other key chain devices. Any of these types of devices can be used to initiate a payment transaction at the point of sale.

A "form factor indicator data tag" can include data relating to the particular form factor of the consumer device being used to conduct a transaction. As this data is forwarded from a merchant, to a payment processing network and an issuer, the information may be used as necessary by such service providers for various purposes. The definition of the data within this tag may be standardized or may be specific to a particular issuer's definition, and may be in the clear or encrypted.

The form factor indicator tag is available to indicate the capabilities of the device used to initiate the transaction at the point of sale. In some embodiments, it is possible for the issuer to personalize one character of track data with values of 1 to 9 (or other value) to indicate the device type. It is recognized that 9 values may not be sufficient to fully define not only the form factor of the device, but other inherent capabilities that the device may possess. Although embodiments of the invention are not limited to the size of a tag, the form factor indicator tag can be sized to 4 bytes (8 hex characters) and can be refined with more definition than is available with one character in track data. The form factor indicator tag can be transmitted in a supplementary data field in an authorization request message from the point of sale to the issuer during an authorization process.

In some embodiments, a form factor indicator tag may include one or more form factor indicator elements. A form factor indictor element may include any suitable data element, which distinguishes the characteristics of a corresponding consumer device from other consumer devices. A form factor indicator element may include a form factor indicator, a device security features element, and a device communications features element. The form factor indicator may include information about the particular form factor of the portable consumer device being used and may be characterized by the physical form factor of the portable consumer device. The device security features element may indicate the type of security features that are present on the particular portable consumer device. Lastly, the device communications feature element may include information about the particular communication features present in the device. Any of these exemplary form factor indicator elements will provide some indication as to the particular type of consumer device being used to conduct a transaction.

Table 1 provides examples of data that can be included in a form factor indicator tag. As illustrated below, the form factor indicator tag may include form factor indicator elements including a form factor indicator, a device security features element, other data elements, and a device communications technology element. Each of the form factor indicator elements may be represented by any suitable identifiers. For example, a form factor indicator be represented by one of the numbers 1-4, and they may represent a full size card, a mini card, a micro tag, and a mobile phone, respectively.

TABLE 1

Examples of data that can be present in a Form Factor Indicator Tag Data

| | | |
|---|---|---|
| 1$^{st}$ byte | Form factor indicator | Full size card |
| | | Mini card |
| | | Micro tag |
| | | Mobile device (phone) |
| | | PDA |
| | | Watch |
| 2$^{nd}$ byte | Device security features element | Signature panel |
| | | Hologram |
| | | Embossing |
| | | Biometric |
| | | CVV (card verification value) |
| | | CVV2 (card verification value 2) |
| | | dCVV (dynamic card verification value) |
| | | CVN 17 (card verification number 17) |
| | | CVN 10 (card verification number 10) |
| | | SDA (static data authentication) |
| | | DDA (dynamic data authentication) |
| | | Text or email capable |
| | | Pre-registered with issuer for authentication messaging |
| | | Crypto coprocessor capable |
| 3$^{rd}$ byte | Other data element | Other data |
| 4$^{th}$ byte | Device communications technology element | ISO 14443 (Proximity) including NFC |
| | | ISO 15693 (Vicinity) |
| | | Infra Red |
| | | Bluetooth |
| | | GSM or other wide area cellular network |

The form factor indicator tag may also be used alone or in combination with a customer exclusive data tag.

A "customer exclusive data tag" may be used to include customer exclusive data. Customer exclusive data may be personalized on the portable consumer device prior to issuance and/or may be derived by the device at the point of sale and placed into this data tag in advance of point of sale authorization. The contents of this tag are then forwarded from the point of sale to the issuer, via a payment processing network, in the supplementary data field as part of an authorization request message.

In sum, in embodiments of the invention, the payment process can include the reading of additional data from a contactless portable consumer device, or other type of consumer device, in the form of data tags from the portable consumer device. This additional data can be included in a supplementary data field such as Field 55. Additional transaction information can be included in the authorization request message to the issuer and can be utilized at any node of the system to provide new services (i.e. used by the merchant, acquirer, payment processing organization, issuer, or other third party service providers). The issuer may provide additional services in addition to the returning of the traditional authorization or decline of the transaction at the time of the purchase. The tags may be used in both on-line and offline transactions.

Customer exclusive data tags and form factor indicator tags are described in further detail below.

Table 2 has samples of the types of data that may be included in the customer exclusive data tag. Information from this table, supplied within the authorization request message to the issuer, may be useful to service providers such as payment processing organizations and card issuers for a variety of purposes. Below are some example business uses for this data. Additional details regarding the use of Customer Exclusive Data Tags are provided in U.S. patent application Ser. No. 12/431,452, entitled "Device Including User Exclusive Data Tag," which is being filed on the same day as the present application and which is herein incorporated by reference in its entirety for all purposes.

TABLE 2

Examples of Customer Exclusive Data to be Included in a Customer Exclusive Tag

| | |
|---|---|
| Cell Phone Number | A phone number may be included in a customer exclusive data tag and may be used by a service provider to send authentication request messages to the phone; there is no need to store this data at the service provider.<br>A phone number may be included in a customer exclusive data tag and may be used provides the service provider with the ability to provide text, coupons, or marketing elements to the phone during a transaction. |
| Email address | An e-mail address may be included in a customer exclusive data tag and may be used by a service provider to provide for authentication and notification messages to a consumer via e-mail. |
| Loyalty number(s) of airline frequent flyer, hotel programs, car rental agencies, etc | Loyalty numbers may be included in a customer exclusive data tag and may be used by a service provider for reporting, assignment of points, and other services. |
| Risk or authentication data | Risk or authentication data may be included in a customer exclusive data tag and may be used by a service provider to provide challenge/response information. |
| Alternate ID for transit use other than PAN | An alternate ID or identifier such as a transit identifier may be included in a customer exclusive data tag and may be used by a service provider to determine if it is on a transit hot list. This number can be sent in an authorization request message and cross referenced to the real PAN for payment. A transit agency can utilize this number in the clear within their systems. This application can be limited to a transit MCC (merchant category code). |
| Transit fare data | Transit fare data may be included in a customer exclusive data tag and may be used as a type of monthly pass that is good for a specified period for specific agency (e.g., on a mobile device, with updates over-the-air or OTA) |
| Prepaid data | Prepaid value data may be included in a customer exclusive data tag and may be kept in-sync with an issuer's data. If the portable consumer device is a mobile device, it can be updated over-the-air. Prepaid value data could also be displayed on the phone. Off-line transit readers could also know if prepaid device has value. |
| Government identifying number(s) | A driver's license, passport number, or registered travel information may be included in a customer exclusive data tag. This information may be used to authenticate the consumer and may be used for other purposes. |
| Other affiliations | Affiliation information can be included in a customer exclusive data tag and may be read by reader and may be used for event entry, such as at a ball game, race track, church, bingo hall, etc. |

TABLE 2-continued

Examples of Customer Exclusive Data to be Included in a Customer Exclusive Tag

| | |
|---|---|
| Preferences | Preference information for airlines (e.g., window or aisle seat), hotels (e.g., queen or double bed), or restaurants (e.g., smoking or non smoking) can be included in a customer exclusive data tag. This information may be read by a merchant or service provider and customized services may be provided to the consumer. |
| Cardholder name | An encrypted or obscured name or other information that only one or multiple merchants can decipher can be included in a customer exclusive data tag. This information may be used for purposes such as authentication. |
| Internet encrypted PAN | A primary account number (PAN), in encrypted or unencrypted form, may be included in a customer exclusive data tag, which is located in a supplemental data field. An alternate PAN may be sent in the normal PAN data field. |
| Other encrypted data | A customer exclusive data tag may include other encrypted data as defined for a particular service. |

Exemplary uses for these data tags are provided below.

I. Exemplary Systems

Figure 1:
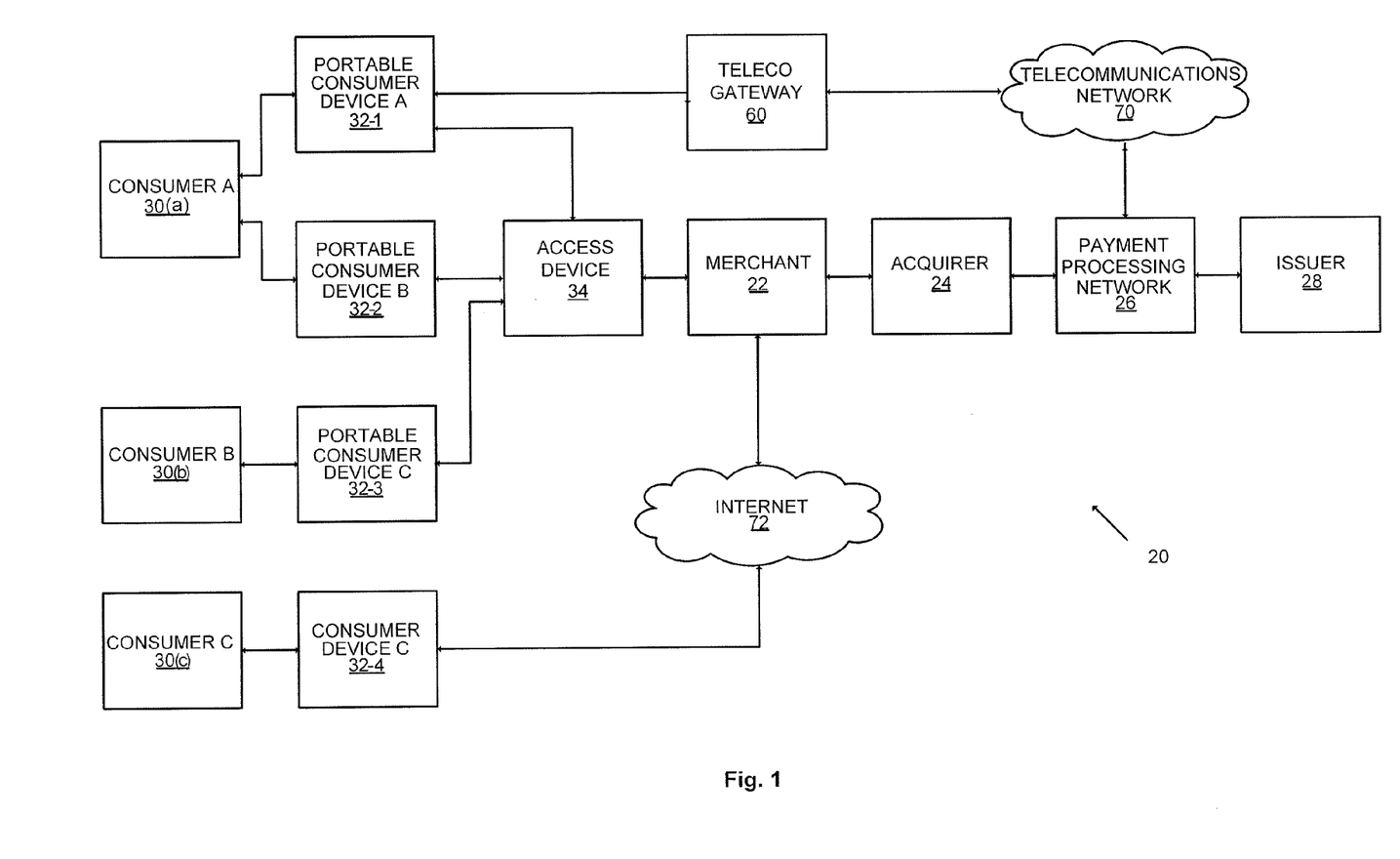
FIG. 1 shows a block diagram of a system that can be used in some embodiments of the invention.

A system according to an embodiment of the invention is shown in FIG. 1.

FIG. 1 shows a system 20 that can be used in an embodiment of the invention. The system 20 includes a merchant 22 and an acquirer 24 associated with the merchant 22. In a typical payment transaction, a consumer such as consumer A 30(*a*) may purchase goods or services at the merchant 22 using a portable consumer device such as portable consumer device A 32-1. The consumer may be an individual, or an organization such as a business that is capable of purchasing goods or services. The acquirer 24 can communicate with an issuer 28 via a payment processing network 26.

As described above, an "issuer" is typically a business entity (e.g., a bank) which maintains financial accounts for the consumer and often issues a portable consumer device such as a credit or debit card to the consumer. A "merchant" is typically an entity that engages in transactions, such as a store, person, or service provider. As used herein, an "acquirer" is typically a business entity, e.g., a commercial bank that has a business relationship with a particular merchant or other entity. Some entities can perform both issuer and acquirer functions. Embodiments of the invention encompass such single entity issuer-acquirers.

In FIG. 1, three consumers, consumer A 30(*a*), consumer B 30(*b*), and consumer C 30(*c*) are illustrated. Consumer A 30(*a*) can use at least two different types of portable consumer devices including consumer device A 32-1 and portable consumer device B 32-2. In one example, consumer device A 32-1 may be in the form of a phone, while portable consumer device B 32-2 may be in the form of a card. The consumer device A 32-1 may consequently be used to communicate with the issuer 28 via a telecommunications gateway 60, a telecommunications network 70, and a payment processing network 26. The different consumer devices A 32-1 and B 32-2 could be linked to the same issuer account number, or could be linked to respectively different issuer account numbers. Consumer B 30(*b*) is another consumer that is illustrated in FIG. 1. Consumer B 30(b) may use a specific type of consumer device C 32-3 such as a key fob. Lastly, consumer C 30(c) may use a specific type of consumer device 32-4 such as a personal computer to communicate with the merchant 22 via the Internet 72.

The consumer devices according to embodiments of the invention may be in any suitable form. In some embodiments, the consumer devices are portable in nature and may be portable consumer devices. Suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Each consumer device may comprise a body, and a memory comprising a computer readable medium disposed on or within the body. The computer readable medium may comprise code for a form factor indicator element coupled to the body. The form factor indicator element may be in a form factor indicator tag. The computer readable medium may also comprise code for one or more customer exclusive data tags (described above). In addition, the consumer device may also include a processor coupled to the memory, where greater functionality and/or security are desired.

Other types of consumer devices may include devices that are not generally carried by consumers to make purchases. An example of a consumer device of this type may be a desktop computer terminal.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

In a typical purchase transaction, a consumer such as consumer A 30(a) purchases a good or service at the merchant 22 using a portable consumer device such as portable consumer device B 32-2, which may be in the form of a credit card. The consumer's portable consumer device B 32-2 can interact with an access device 34 such as a POS (point of sale) terminal at the merchant 22. For example, the consumer 30 may take the credit card and may swipe it through an appropriate slot in the POS terminal. Alternatively, the POS terminal may be a contactless reader, and the portable consumer device B 32-2 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device B 32-2.

After the issuer 28 receives the authorization request message, the issuer 28 sends an authorization response message back to the payment processing network 26 (step 56) to indicate whether or not the current transaction is authorized (or not authorized). The transaction processing system 26 then forwards the authorization response message back to the acquirer 24. The acquirer 24 then sends the response message back to the merchant 22.

After the merchant 22 receives the authorization response message, the access device 34 at the merchant 22 may then provide the authorization response message for consumer A 30(a). The response message may be displayed by the access device 34, or may be printed out on a receipt.

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

II. Exemplary Consumer Devices, Access Devices, and Computer Apparatuses

Figure 2A:
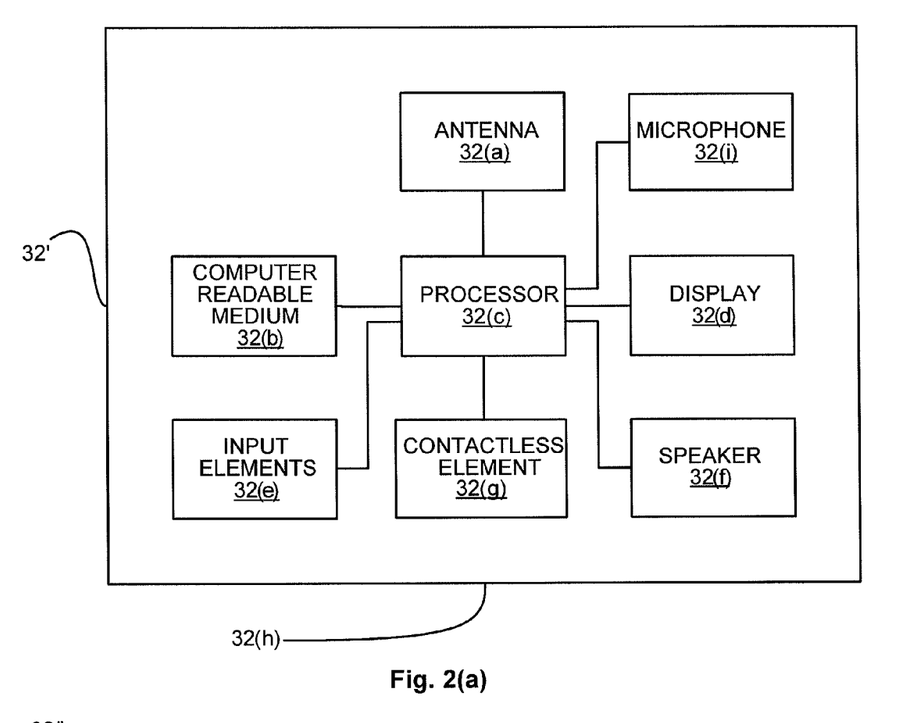
FIG. 2(a) shows a block diagram of a consumer device in the form of a phone.
Figure 2B:
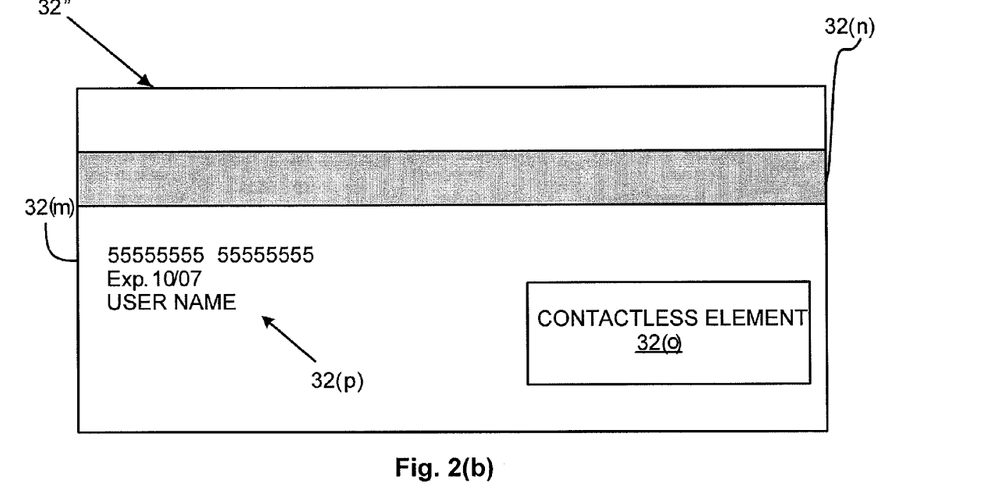
FIG. 2(b) shows an illustration of a payment card.

FIG. 2(a) shows a block diagram of another phone 32' that can be used in embodiments of the invention. The exemplary wireless phone 32' may comprise a computer readable medium and a body as shown in FIG. 2(a). The computer readable medium 32(b) may be present within the body 32(h), or may be detachable from it. The body 32(h) may be in the form a plastic substrate, housing, or other structure. The computer readable medium 32(b) may be a memory that stores data (e.g., data relating to issuer specific payment services) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, a bank identification number (BIN), credit or debit card number information, account balance information, expiration date, consumer information such as name, date of birth, etc. Any of this information may be transmitted by the phone 32'.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) phone 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(c) (e.g., a microprocessor) for processing the functions of the phone 32 and a display 32(d) to allow a consumer to see phone numbers and other information and messages. The phone 32' may further include input elements 32(e) to allow a consumer to input information into the device, a speaker 32(f) to allow the consumer to hear voice communication, music, etc., and a microphone 32(i) to allow the consumer to transmit her voice through the phone 32'. The phone 32' may also include an antenna 32(a) for wireless data transfer (e.g., data transmission).

Figure 3:
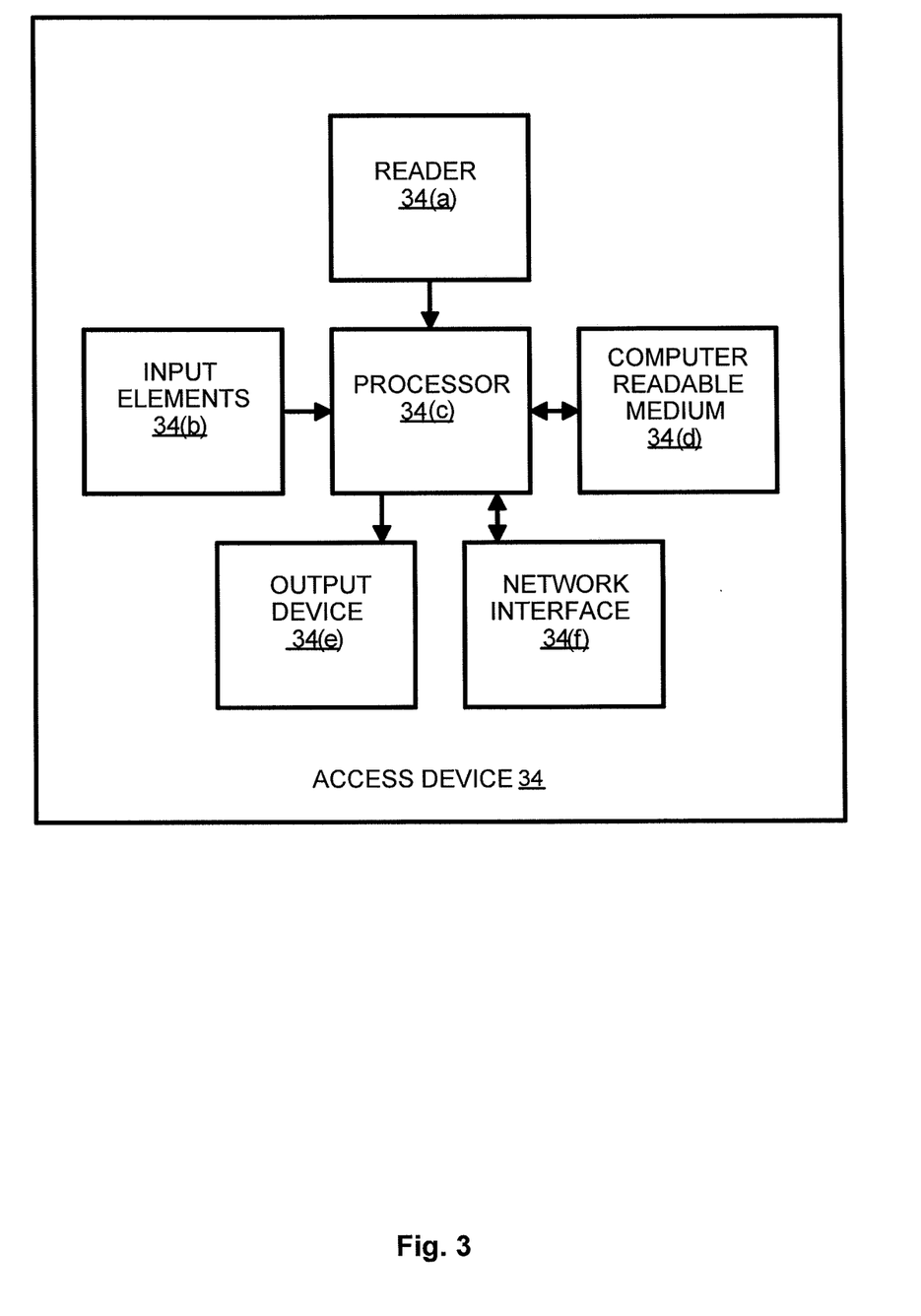
FIG. 3 shows a block diagram of an access device according to an embodiment of the invention.

FIG. 3 shows a block diagram of an access device 34 according to an embodiment of the invention. The access device 34 comprises a processor 34(c) operatively coupled to a computer readable medium 32(d) (e.g., one or more memory chips, etc.), input elements 32(b) such as buttons or the like, a reader 32(a) (e.g., a contactless reader, a magnetic stripe reader, etc.), an output device 32(e) (e.g., a display, a speaker, etc.) and a network interface 32(f).

Figure 4:
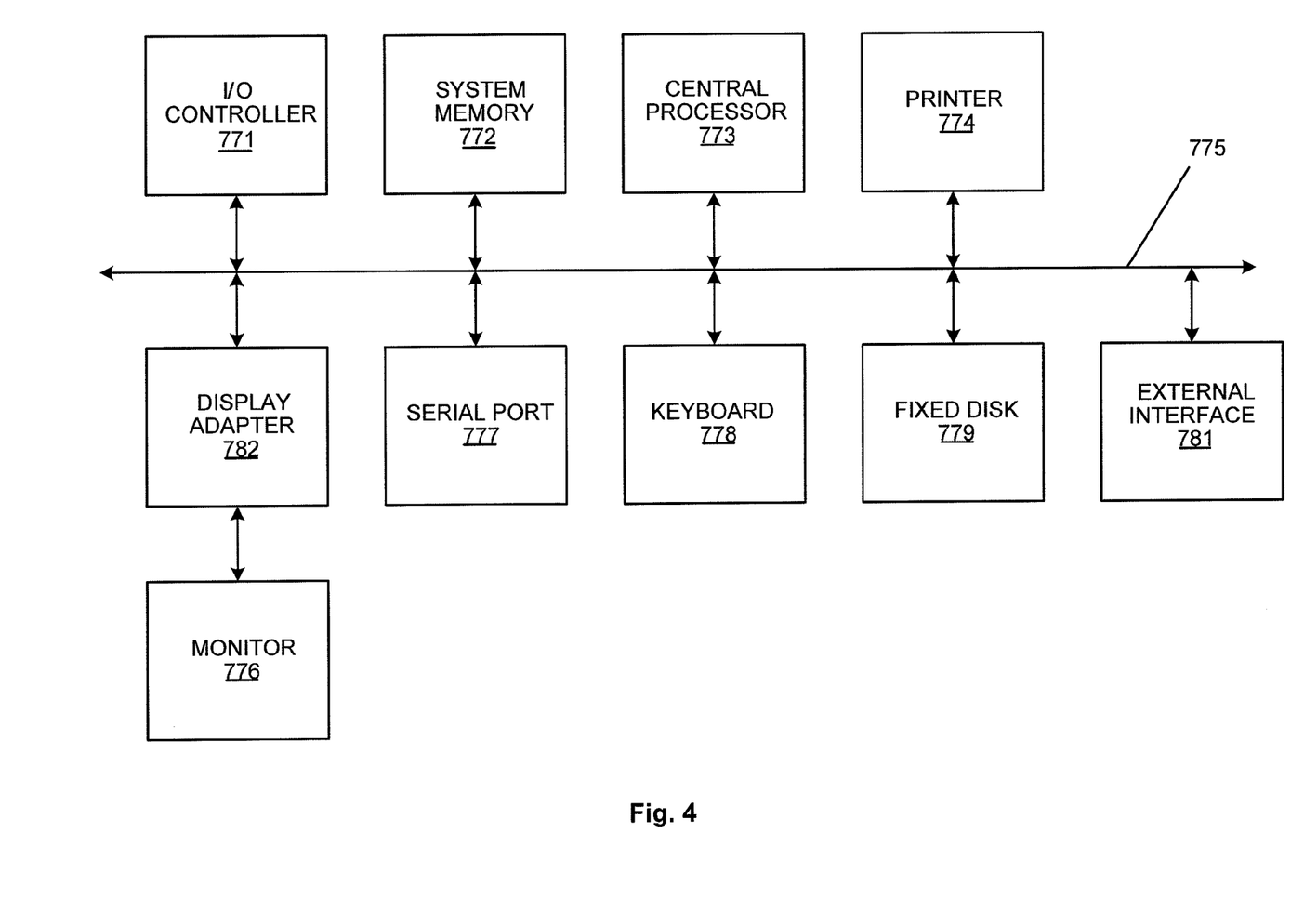
FIG. 4 shows a block diagram of a computer apparatus.

The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 4. The subsystems shown in FIG. 4 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Exemplary Methods

Form Factor Indicator Alone

As form factors evolve, so does the communication technology that is utilized to perform the payment transaction. Today, magnetic stripes and ISO 14443 contactless payment technologies are used. Proximity payment mechanisms using Bluetooth®, Infra Red (IR), vicinity payments (ISO 15693), wide area cellular GSM/CDMA/TDMA, and many other potential communication interfaces could be used.

In a similar vein, the ability of devices to perform cryptographic or authentication functions will also change over time. This gives a service provider such as an organization that operates a payment processing network or an issuer the ability to improve from simple static cryptograms, to dynamic cryptograms and transaction-specific authentication techniques.

Table 1 above provides examples of some types of indications that may be utilized or defined with the form factor indicator tag. As noted below, a form factor indicator tag according to an embodiment of the invention can include a first part that includes a form factor indicator element, a second part that includes a device security features element, and another part that may include a device communications technology element. Each of these can characterize the consumer device's form, its ability to communicate, its ability to store and/or process data, its security characteristics, etc.

Figure 5:
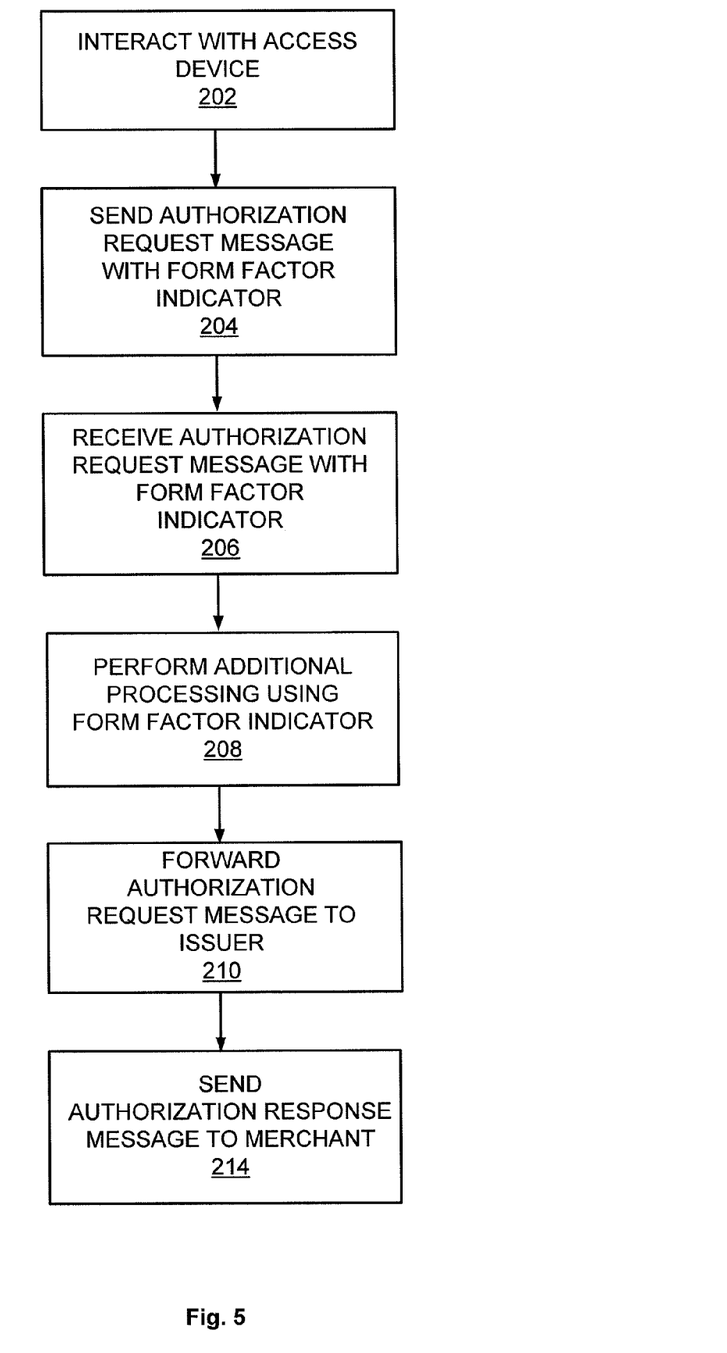
FIGS. 5-6 show flowcharts illustrating methods performed according to embodiments of the invention.

Methods according to embodiments of the invention can be described with respect to FIGS. 1 and 5. Generally, the method may include obtaining a portable consumer device comprising a body, and a memory comprising a computer readable medium disposed on or within the body, the computer readable medium comprising a form factor indicator element coupled to the body; and using the portable consumer device to interact with an access device, wherein the access device thereafter generates and sends an authorization request message to an issuer associated with the portable consumer device. A server computer at the issuer or the payment processing network may thereafter analyze the authorization request message and the form factor indicator element in the authorization request message. The server computer may thereafter perform additional processing using the form factor indicator element.

In an exemplary embodiment, a consumer A 30(a) may first use his portable consumer device A 32-1 to purchase a good or service at a merchant 22. The portable consumer device A 32-1 may be in the form of a phone with a contactless element (as described above with respect to FIG. 2(a)). When making the purchase, the consumer A 30(a) may pass the portable consumer device A 32-1 by the access device 34, or may otherwise interact with it (step 202). The form factor indicator tag may be stored in a memory in the portable consumer device A 32-1. The form factor indicator tag and account information such as the account number associated with the issuer 28 may pass from the portable consumer device A 32-1 to the access device 34. A reader in the access device 34 can read the form factor indicator tag and the account information, and a processor in the access device 34 can generate an authorization request message including the form factor indictor tag, the account information (e.g., a BIN, expiration date, etc.), a merchant code (e.g., a merchant category code), and the price associated with the good or service purchased. The access device 34 may then send the authorization request message to the payment processing network 26 via the merchant's acquirer 24 (step 204). Although form factor indicator elements are included in a form factor indicator tag in this embodiment, a form factor indicator element could be sent in an authorization request message without being in a tag in other embodiments of the invention.

A server computer in the payment processing network 26 can then receive (step 206) and analyze the authorization request message and can perform additional processing (step 208) using the form factor indicator tag, before sending the authorization request message on to the issuer 28 for approval. The additional processing may or may not involve additional, subsequent communication with the consumer (e.g., consumer A 30(*a*)). In one embodiment of the invention, additional processing comprises initiating the sending of a notification message to the consumer device (e.g., portable consumer device A 32-1). Other examples of additional processing (step 208) are provided below.

The server computer in the payment processing network 26 may comprise code for receiving, at the server computer, an authorization request message comprising a form factor indicator element, where the form factor indicator element was previously stored in a consumer device; code for analyzing the authorization request message; and code for performing additional processing based on the form factor indicator element.

Although a server at the payment processing network 26 is described as performing additional processing in this and in other examples in this application, it is understood that other entities including the merchant 22, acquirer 24, issuer 28, or a third party processor may perform such additional processing using its own server computer.

The authorization request message is then forwarded to the issuer 28 for approval (step 210). The issuer 28 may then approve or deny the transaction, depending on whether there is sufficient credit and/or sufficient funds in the consumer A's account. After this, the issuer 28 sends an authorization response message back to access device 34 via the acquirer 24 and the payment processing network 26 (step 212).

In embodiments of the invention, one or more pieces of information from Table 1 above, supplied within the authorization request message to the issuer, may be useful to service providers such as payment processing organizations and issuers for a variety of purposes. Some examples of transactions that can effectively use a form factor indicator tag to perform additional processing are provided below.

Interchange and chargeback: (1) In one example, a form factor indicator tag in an authorization request message may indicate the type of security features (byte 2) associated with a particular portable consumer device (e.g., portable consumer device A 32-1) and may indicate to the merchant 22 that chargeback protection is available or not available for that portable consumer device 32-1. The merchant may proceed with the transaction under specific conditions (or not) based on this. Chargeback protection may be available where a consumer device is considered secure (e.g., in the case of a phone) or may not be available where the consumer device is considered less secure (e.g., in the case of a typical payment card). The issuer 28 or the payment processing network 26 may send an authorization response message back to the merchant 22 with the indication as to whether or not chargeback protection is available. (2) In another example, interchange rules for preferential treatment could be established depending upon the security of the particular consumer device being used. Interchange fees are fees that are paid by an acquirer to an issuer during a payment transaction. If the consumer device that is being used by the consumer is more secure, the organization that operates the payment processing network 26 and/or the issuer 28 may provide a lower interchange fee if more secure consumer devices are used. For example, if the consumer device is a phone (byte 1) and has a biometric device (byte 2), then a lower interchange fee may apply to the transaction as compared to a transaction that is conducted using an ordinary payment card without a biometric device.

Authentication: (1) In one example, the payment processing network 26 may receive an authorization request message indicating that the consumer device communications technology (byte 4) for the consumer device is not proximity based (within 2 inches). The consumer device (byte 1) may then need to be mobile in nature so that a message can be sent to the cardholder for transaction approval by the cardholder. (2) In another example, certain device types (byte 1) without proper security capability (byte 2) may be declined for specific transaction types or specific transaction value thresholds. For example, a key fob with no signature panel may be limited to transactions under $25, whereas a card with a signature panel may be used for transactions over $25. A server computer in the payment processing network 26 or the issuer 28 may receive an authorization request message and may analyze it to determine the form factor of the consumer device being used. It may then approve or deny the transaction based on the particular form factor of the consumer device and the particular parameters of the transaction. (3) In another example, combinations of capabilities could be an indication of counterfeit or fraud. For example, an authorization request message indicating, for example, a signature panel (byte 2) and a micro tag (byte 1) may indicate that fraud is present, since micro tags do not have signature panels.

Security: In another example, if the read range is a longer distance than proximity (e.g., with Bluetooth™), additional messaging may be needed to confirm the transaction; or other data elements may need to be present in the transaction to authenticate the consumer device being used. Transactions that are conducted with devices that communicate through longer distances to a POS terminal may be more susceptible to fraud, since a merchant may or may not be able to review the consumer's use of the consumer device as it is used to interact with the access device 34.

Marketing: (1) In another example, and authorization request message may include a form factor indicator tag which indicates that a mobile device (byte 1) (consumer device A 32-1) is being used to conduct the transaction. A server computer in a payment processing network 26 may direct the issuer 28 to send a coupon or other marketing message to the consumer device 32-1 at the access device 34 or point of sale. The issuer 28 may have co-marketing deals with specific merchants or product manufacturers.

Form Factor Indictor and Customer Exclusive Data Tags Used Together

Figure 6:
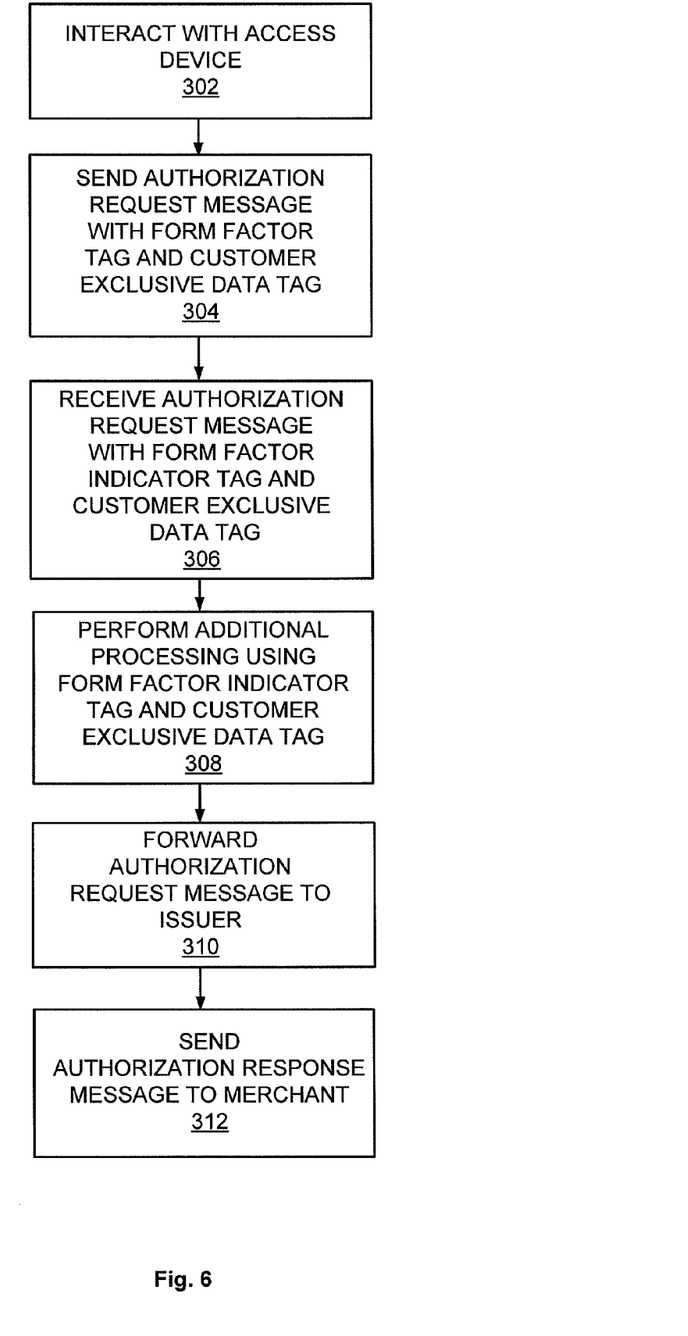

In some embodiments of the invention a form factor indicator tag can be used with a customer exclusive data tag. Referring to FIGS. 1 and 6, a consumer A 30(*a*) may first use his portable consumer device A 32-1 to purchase a good or service at a merchant 22. The portable consumer device A 32-1 may be in the form of a phone with a contactless element (as described above with respect to FIG. 2(*a*). When making the purchase, the consumer A 30(*a*) may pass the portable consumer device A 32-1 by the access device 34, or may otherwise interact with it (step 302). The form factor indicator tag may be stored in a memory in the portable consumer device A 32-1. The form factor indicator tag and account information such as the account number associated with the issuer 28 may pass from the portable consumer device A 32-1 to the access device 34. In addition, a customer exclusive data tag may have been previously stored in the memory of the portable consumer device A 32-1 and it may pass to the access device 34. A reader in the access device 34 can read the customer exclusive data tag, and the form factor indicator tag and the account information, and a processor in the access device 34 can generate an authorization request message including the customer exclusive data tag and the form factor indictor tag, the account information, the merchant code, and the price associated with the good or service purchased. The access device 34 may then send the authorization request message to the payment processing network 26 via the merchant's acquirer 24 (step 304).

A server computer in the payment processing network 26 can then receive (step 306) and analyze the authorization request message and can perform additional processing (step 308) using the form factor indicator tag and the customer exclusive data tag, before sending the authorization request message on to the issuer 28 for approval.

The authorization request message is then forwarded to the issuer 28 for approval (step 310). The issuer 28 may then approve or deny the transaction, depending on whether there is sufficient credit and/or sufficient funds in the consumer A's account. After this, the issuer 28 sends an authorization response message back to access device 34 via the acquirer 24 and the payment processing network 26 (step 312).

In one specific example, the form factor indicator tag in the authorization request message may indicate that the consumer device is a mobile phone (byte 1 of the tag). The customer exclusive data tag may include the phone number of the mobile phone. The server computer in a payment processing network 26 or in another location can then send an authentication message to the consumer device 32-1 by SMS, text, or e-mail as provided in a customer exclusive data tag in the authorization request message. In another example, it is possible to take the form factor indicator from byte 1 of the form factor indicator tag, and then use the consumer device to encrypt it for security purposes. It is then possible to send an authorization request message with the encrypted indicator tag to the issuer 28 in the customer exclusive data tag. This could be used as an indication that the transaction was not tampered with and that the transaction is authentic.

Although a specific example is provided, it is also understood that any of the form factor indicator elements in Table 1 may be combined with any of the customer exclusive data elements in Table 2, in any suitable authorization request message, or other type of message.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A consumer device comprising:
    a body; and
    a memory comprising a computer readable medium disposed on or within the body, the computer readable medium comprising code for a form factor indicator coupled to the body, the form factor indicator indicating whether the consumer device is a full size card, a mini card, a micro tag, a mobile device, a PDA, a pager, a watch, a transponder, a keychain device, a key fob, or a desktop computer terminal.

2. The consumer device of claim 1 wherein the consumer device is a phone, and wherein the form factor indicator indicates that the consumer device is the phone.

3. The consumer device of claim 1 wherein the consumer device is in the form of a card, and wherein the form factor indicator indicates that the consumer device is the card.

4. The consumer device of claim 1 wherein the form factor indicator is a data tag that includes a tag identifier element, a length element, and a value element.

5. The consumer device of claim 4 wherein the form factor indicator is included in a Field 55 supplementary data field.

6. The consumer device of claim 4 wherein the data tag further comprises a device security features element, and wherein specific transaction value thresholds are established for each of a plurality of device security features elements.

7. A method comprising:
    receiving, at a server computer, a first authorization request message comprising a first form factor indicator element, wherein the first form factor indicator element indicates a first form of a first consumer device used to conduct a first transaction, wherein the first form is one of a full size card, a mini card, a micro tag, a mobile device, a PDA, a pager, a watch, a transponder, a keychain device, a key fob, or a desktop computer terminal;

analyzing the first authorization request message;
performing first additional processing based on the first form factor indicator element;
receiving, at the server computer, a second authorization request message comprising a second form factor indicator element, wherein the second form factor indicator element indicates a second form of a second consumer device used to conduct a second transaction, wherein the first form is different than the second form;
analyzing the second authorization request message; and
performing second additional processing based on the second form factor indicator element, wherein the first additional processing is different than the second additional processing.

8. The method of claim 7 further comprising:
wherein performing the first additional processing comprises initiating sending a notification message to the consumer device.

9. The method of claim 8 wherein the consumer device is a phone.

10. The method of claim 7 wherein the first form factor indicator element and the second form factor indicator element comprise device security feature data.

11. The method of claim 7 wherein the first authorization request message and the second authorization request message further comprise device communication technology features data.

12. The method of claim 7 wherein the first authorization request message and the second authorization request message comprise a BIN.

13. The method of claim 7 wherein the first form factor indicator element and the second form factor indicator element are encrypted.

14. The method of claim 7 wherein the first form is a phone and wherein the first additional processing comprises initiating the sending of a coupon to the first consumer device.

15. A server computer having a computer readable program code embodied therein, said computer readable program code adapted to be executed by a processor to implement a method comprising:
receiving a first authorization request message comprising a first form factor indicator element, wherein the first form factor indicator element indicates a first form of a first consumer device used to conduct a first transaction, wherein the first form is one of a full size card, a mini card, a micro tag, a mobile device, a PDA, a pager, a watch, a transponder, a keychain device, a key fob, or a desktop computer terminal;
analyzing the first authorization request message;
performing first additional processing based on the first form factor indicator element;
receiving a second authorization request message comprising a second form factor indicator element, wherein the second form factor indicator element indicates a second form of a second consumer device used to conduct a second transaction, wherein the second form is different than the first form;
analyzing the second authorization request message; and
performing second additional processing based on the second form factor indicator element.

16. A system comprising the server computer of claim 15.

17. A method comprising:
obtaining a portable consumer device comprising a body, and a memory comprising a computer readable medium disposed on or within the body, the computer readable medium comprising code for a form factor indicator element coupled to the body, the form factor indicator element indicating whether the consumer device is a full size card, a mini card, a micro tag, a mobile device, a PDA, a pager, a watch, a transponder, a keychain device, a key fob, or a desktop computer terminal; and
using the portable consumer device to interact with an access device, wherein the access device thereafter generates and sends an authorization request message to an issuer associated with the portable consumer device.

18. The method of claim 17 wherein the portable consumer device is a phone, and wherein the form factor indicator indicates that the portable consumer device is the phone.

19. The method of claim 17 wherein the portable consumer device is a card, and wherein the form factor indicator indicates that the portable consumer device is the card.

20. The method of claim 17 wherein the authorization request message is sent to the issuer via a payment processing network.

* * * * *